United States Patent
Kadgi et al.

(10) Patent No.: US 9,292,288 B2
(45) Date of Patent: Mar. 22, 2016

(54) SYSTEMS AND METHODS FOR FLAG TRACKING IN MOVE ELIMINATION OPERATIONS

(71) Applicants: Vijaykumar B. Kadgi, Portland, OR (US); Jeremy R. Anderson, Hillsboro, OR (US); James D. Hadley, Penang (MY); Tong Li, Portland, OR (US); Matthew C. Merten, Hillsboro, OR (US)

(72) Inventors: Vijaykumar B. Kadgi, Portland, OR (US); Jeremy R. Anderson, Hillsboro, OR (US); James D. Hadley, Penang (MY); Tong Li, Portland, OR (US); Matthew C. Merten, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 509 days.

(21) Appl. No.: 13/861,009
(22) Filed: Apr. 11, 2013

(65) Prior Publication Data

US 2014/0310504 A1 Oct. 16, 2014

(51) Int. Cl.
*G06F 9/30* (2006.01)
*G06F 9/45* (2006.01)
*G06F 9/38* (2006.01)

(52) U.S. Cl.
CPC ............ *G06F 9/30105* (2013.01); *G06F 8/443* (2013.01); *G06F 9/30032* (2013.01); *G06F 9/30094* (2013.01); *G06F 9/30098* (2013.01); *G06F 9/30181* (2013.01); *G06F 9/384* (2013.01)

(58) Field of Classification Search
None
See application file for complete search history.

(56) References Cited

U.S. PATENT DOCUMENTS

| | | | |
|---|---|---|---|
| 5,727,176 A | 3/1998 | Clift et al. | |
| 5,838,941 A | 11/1998 | Valentine et al. | |
| 6,047,369 A * | 4/2000 | Colwell | G06F 9/30032 712/217 |
| 6,505,293 B1 | 1/2003 | Jourdan et al. | |
| 6,591,332 B1 | 7/2003 | Swanson et al. | |
| 6,594,754 B1 * | 7/2003 | Jourdan | G06F 9/30167 712/216 |
| 6,625,723 B1 * | 9/2003 | Jourday | G06F 9/3824 712/216 |
| 6,772,317 B2 * | 8/2004 | Jourdan | G06F 9/3838 712/217 |
| 6,889,344 B2 | 5/2005 | Williams | |
| 7,155,599 B2 * | 12/2006 | Jourdan | G06F 9/3836 712/227 |

(Continued)

FOREIGN PATENT DOCUMENTS

| | | | |
|---|---|---|---|
| GB | 2490033 A | * 10/2012 | ............. G06F 9/384 |
| TW | I2880507 | 5/2007 | |

(Continued)

OTHER PUBLICATIONS

'Flexible Register Management using Reference Counting' by Steven Battle et al., copyright 2011, IEEE.*

(Continued)

*Primary Examiner* — Steven Snyder
(74) *Attorney, Agent, or Firm* — Lowenstein Sandler LLP

(57) ABSTRACT

Systems and methods for flag tracking in data manipulation operations involving move elimination. An example processing system comprises a first data structure including a plurality of physical register values; a second data structure including a plurality of pointers referencing elements of the first data structure; a third data structure including a plurality of move elimination sets, each move elimination set comprising two or more bits representing two or more logical data registers, the third data structure further comprising at least one bit associated with each move elimination set, the at least one bit representing one or more logical flag registers; a fourth data structure including an identifier of a data register sharing an element of the first data structure with a flag register; and a move elimination logic configured to perform a move elimination operation.

20 Claims, 12 Drawing Sheets

(56) References Cited

U.S. PATENT DOCUMENTS

| | | | |
|---|---|---|---|
| 7,711,898 B2* | 5/2010 | Sodani | G06F 9/3824 |
| | | | 711/118 |
| 8,661,230 B2* | 2/2014 | Alexander | G06F 9/30098 |
| | | | 712/217 |
| 8,914,617 B2* | 12/2014 | Raikin | G06F 12/0862 |
| | | | 712/217 |
| 9,069,546 B2* | 6/2015 | Alexander | G06F 9/30098 |
| 9,182,986 B2* | 11/2015 | Rajwar | G06F 9/30145 |
| 2003/0126410 A1 | 7/2003 | Savransky et al. | |
| 2003/0217249 A1* | 11/2003 | Postiff | G06F 9/3842 |
| | | | 712/217 |
| 2009/0327661 A1* | 12/2009 | Sperber | G06F 9/30098 |
| | | | 712/217 |
| 2011/0208918 A1 | 8/2011 | Raikin et al. | |
| 2012/0005459 A1 | 1/2012 | Fleischman et al. | |
| 2012/0265969 A1* | 10/2012 | Alexander | G06F 9/30098 |
| | | | 712/220 |
| 2013/0138922 A1* | 5/2013 | Eres | G06F 9/384 |
| | | | 712/200 |
| 2014/0068230 A1* | 3/2014 | Madduri | G06F 9/30032 |
| | | | 712/216 |
| 2014/0095838 A1* | 4/2014 | Kadgi | G06F 9/384 |
| | | | 712/220 |
| 2014/0189324 A1* | 7/2014 | Combs | G06F 9/30032 |
| | | | 712/225 |
| 2014/0281432 A1* | 9/2014 | Anderson | G06F 9/30181 |
| | | | 712/226 |
| 2015/0277911 A1* | 10/2015 | Khartikov | G06F 9/30032 |
| | | | 712/217 |

FOREIGN PATENT DOCUMENTS

| | | |
|---|---|---|
| TW | 200819966 | 5/2008 |
| TW | 200935303 A | 8/2009 |
| TW | I342498 B | 5/2011 |
| TW | I370968 | 8/2012 |

OTHER PUBLICATIONS

'Putting the Fill Unit to Work: Dynamic Optimizations for Trace Cache Microprocessors' by Daniel Holmes Friendly et al., copyright 1998, IEEE.*

'A Novel Renaming Scheme to Exploit Value Temporal Locality through Physical Register Reuse and Unification' by Stephan Jourdan et al., copyright 1998, IEEE.*

'RENO: A Rename-Based Instruction Optimizer' by Vlad Petric et al., Dec. 9, 2004.*

'Dynamic Code Value Specialization Using the Trace Cache Fill Unit' by Weifeng Zhang et al., Published in the 24th International Conference on Computer Design, Oct. 2006.*

Taiwan IPO Search Report completed Jun. 22, 2015, for Taiwan Patent Application No. 103112305, filed Apr. 2, 2014.

International Search Report and Written Opinion received for PCT Patent Application No. PCT/US2014/033486, mailed on Jun. 27, 2014, 9 pages.

Jeremy R. Anderson, U.S. Appl. No. 13/840,462, filed Mar. 15, 2013, titled "Systems and Methods for Move Elimination With Bypass Multiple Instantiation Table", 78 pages.

* cited by examiner

RAT 421 PRF 423
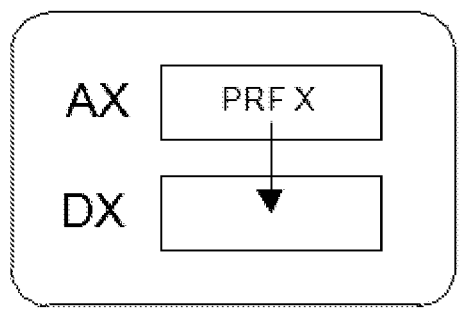
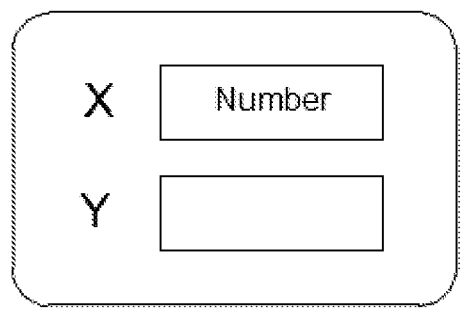
MOV DX, AX
FIG. 5

|  | C | SPAZO |
|---|---|---|
| LDstV | | |
| LDst | | |

FIG. 6a

|  | C | SPAZO |
|---|---|---|
| LDstV | | |
| LDst | | |
| MEV | | |
| MECol | | |

FIG. 6b

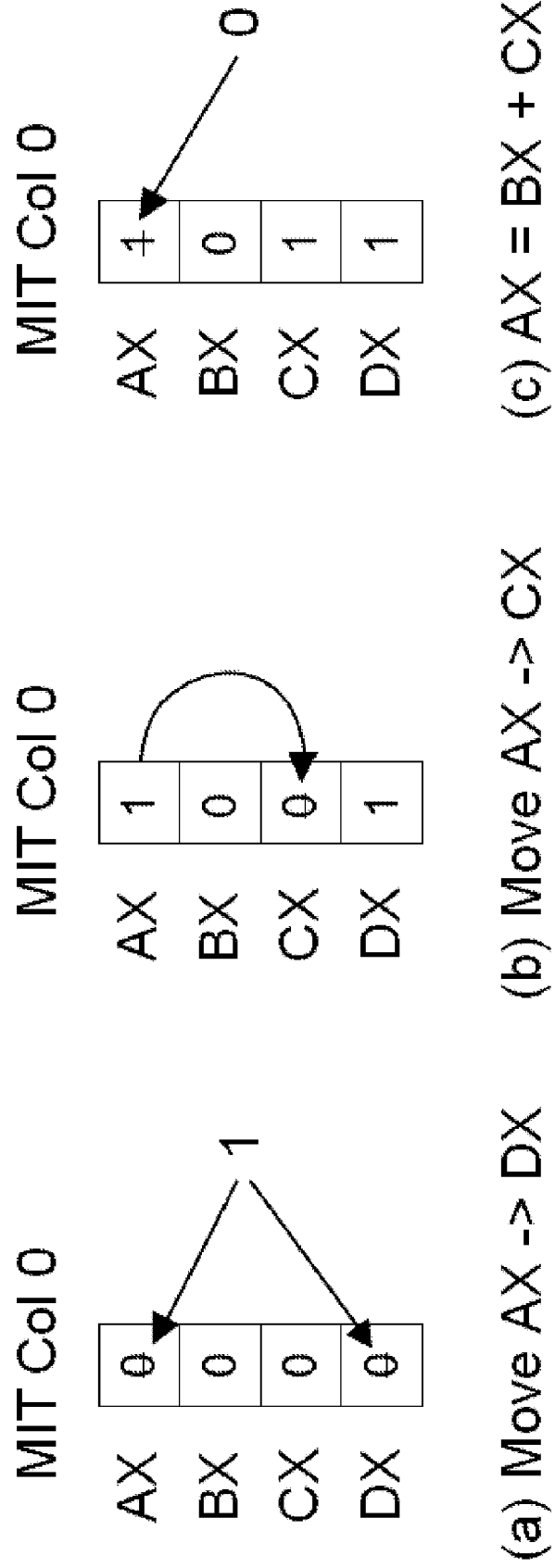
FIG. 7a (a) Move AX -> DX
FIG. 7b (b) Move AX -> CX
FIG. 7c (c) AX = BX + CX

| CFlg Tracker | |
|---|---|
| LdstV | 1 |
| Ldst | EBX |
| MEV | 0 |
| MECol | 1 |

FIG. 8c

| CFlg Tracker | |
|---|---|
| LdstV | 0 |
| Ldst | EAX |
| MEV | 1 |
| MECol | 1 |

FIG. 8b

| CFlg Tracker | |
|---|---|
| LdstV | 1 |
| Ldst | EAX |
| MEV | 0 |
| MECol | 0 |

FIG. 8a

| MIT Column 0 | |
|---|---|
| AX | 0 |
| BX | 0 |
| CFlg | 0 |

| C Flag Tracker | |
|---|---|
| LdstV | 1 |
| Ldst | EAX |
| MEV | 0 |
| MECol | 0 |

FIG. 9a

| MIT Column 0 | |
|---|---|
| AX | 1 |
| BX | 1 |
| CFlg | 1 |

| C Flag Tracker | |
|---|---|
| LdstV | 0 |
| Ldst | EAX |
| MEV | 1 |
| MECol | 0 |

FIG. 9b

| MIT Column 0 | |
|---|---|
| AX | 0 |
| BX | 1 |
| CFlg | 1 |

| C Flag Tracker | |
|---|---|
| LdstV | 0 |
| Ldst | EAX |
| MEV | 1 |
| MECol | 0 |

FIG. 9c

| MIT Column 0 | |
|---|---|
| AX | 0 |
| BX | 0 |
| CFlg | 1 |

| C Flag Tracker | |
|---|---|
| LdstV | 0 |
| Ldst | EAX |
| MEV | 0 |
| MECol | 0 |

FIG. 9d

| MIT Column 2 | |
|---|---|
| AX | 0 |
| BX | 0 |
| CFlg | 0 |

| C Flag Tracker | |
|---|---|
| LdstV | 1 |
| Ldst | EAX |
| MEV | 0 |
| MECol | 0 |

FIG. 10a

| MIT Column 2 | |
|---|---|
| AX | 1 |
| BX | 1 |
| CFlg | 1 |

| C Flag Tracker | |
|---|---|
| LdstV | 0 |
| Ldst | EAX |
| MEV | 1 |
| MECol | 2 |

FIG. 10b

| MIT Column 2 | |
|---|---|
| AX | 0 |
| BX | 1 |
| CFlg | 0 |

| C Flag Tracker | |
|---|---|
| LdstV | 1 |
| Ldst | EAX |
| MEV | 0 |
| MECol | 2 |

FIG. 10c

| MIT Column 2 | |
|---|---|
| AX | 0 |
| BX | 0 |
| CFlg | 0 |

| C Flag Tracker | |
|---|---|
| LdstV | 1 |
| Ldst | EAX |
| MEV | 0 |
| MECol | 2 |

FIG. 10d

SYSTEMS AND METHODS FOR FLAG TRACKING IN MOVE ELIMINATION OPERATIONS

TECHNICAL FIELD

The present disclosure is generally related to computer systems, and is specifically related to improving efficiency of executing data manipulation operations by computer systems.

BACKGROUND

Data manipulation operations represent a significant portion of operations performed by a processor. Hence, optimizing their execution may increase the overall performance of the processor.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 schematically illustrates an example of executing a move operation by register aliasing, in accordance with one or more aspects of the present disclosure;

FIGS. 6a-6b schematically illustrate examples of a Flag Tracker data structure in accordance with one or more aspects of the present disclosure;

FIGS. 7a-7c schematically illustrate several examples of using a Multiple Instantiation Table (MIT) for Physical Register File (PRF) entry tracking, in accordance with one or more aspects of the present disclosure;

FIGS. 8a-8c schematically illustrate one example of employing a Flag Tracker data structure for MIT entry tracking, in accordance with one or more aspects of the present disclosure;

FIGS. 9a-9d and 10a-10d schematically illustrate examples of flag tracking logic in move elimination operations, in accordance with one or more aspects of the present disclosure;

DETAILED DESCRIPTION

Figure 1:
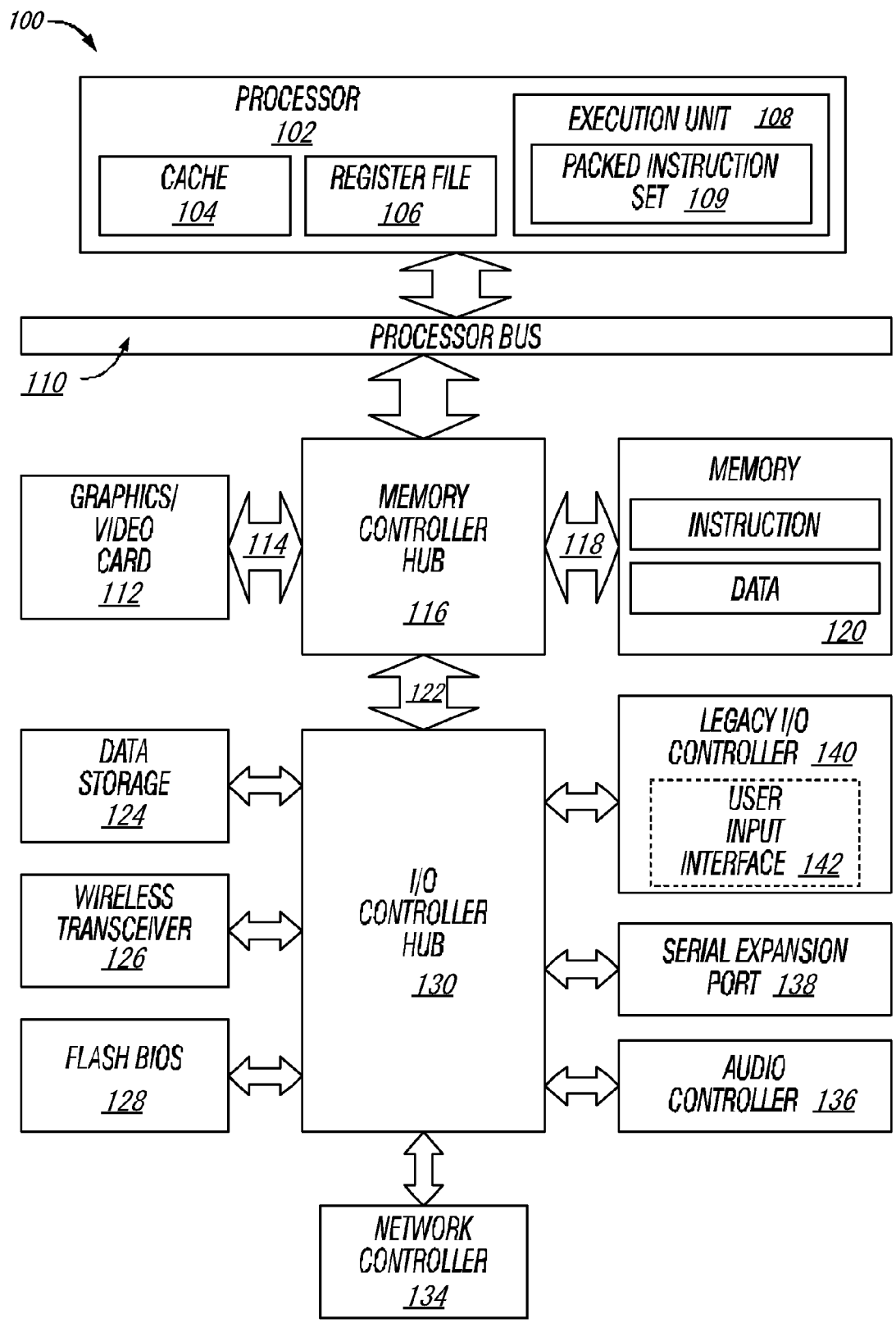
FIG. 1 depicts a high-level component diagram of an example computer system, in accordance with one or more aspects of the present disclosure.

Described herein are computer systems and related technologies for flag tracking in data manipulation operations involving move elimination. "Move elimination" herein shall refer to executing a register copying operation without employing the execution unit, in order to improve the efficiency of execution.

In certain implementations, move elimination may be implemented by register aliasing: a first data structure, referred to as Physical Register File (PRF), may be employed to store physical register values, and a second data structure, referred to as Register Alias Table (RAT), may be employed to store pointers mapping logical register identifiers to PRF entries. Register aliasing allows executing certain instructions by modifying one or more pointers in the RAT without sending those instructions to the execution unit. Examples of such instructions include register zeroing instructions (such as, for example, XOR AX, AX) and register copying instructions (such as MOV instructions). Because a register copying instruction does not create a new value, the source register pointer may be copied into the destination register pointer in the RAT, so that the instruction would not need to employ the execution unit and another PRF entry. This process is referred to as "move elimination," since the move instruction is eliminated from the stream sent to the execution unit.

An integer instruction may modify not only a destination register value, but also one or more of processor status flags. To store flag values, each PRF entry can include, along with a field for the data register value, one or more fields for the flag values.

Usage of PRF table entries by physical registers and flags may need to be tracked in order to determine when a PRF entry may be released for use by a new instruction. Described herein below are systems and methods for efficient flag tracking in move elimination operations. Various aspects of the above referenced methods and systems are described in details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed.

In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processor cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

FIG. 1 depicts a high-level component diagram of one example of a computer system in accordance with one or more aspects of the present disclosure. A computer system 100 may include a processor 102 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
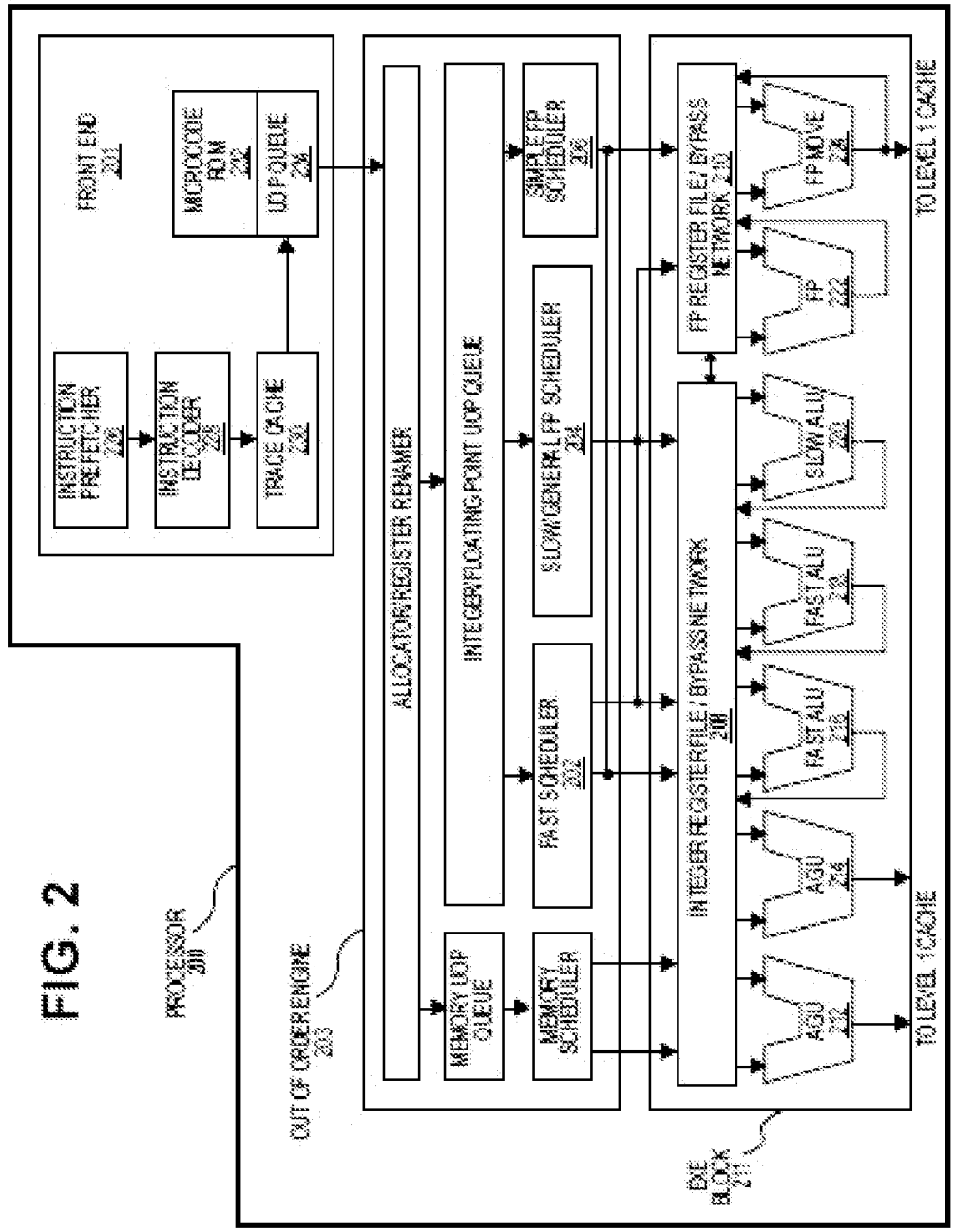
FIG. 2 depicts a block diagram of a processor, in accordance with one or more aspects of the present disclosure.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
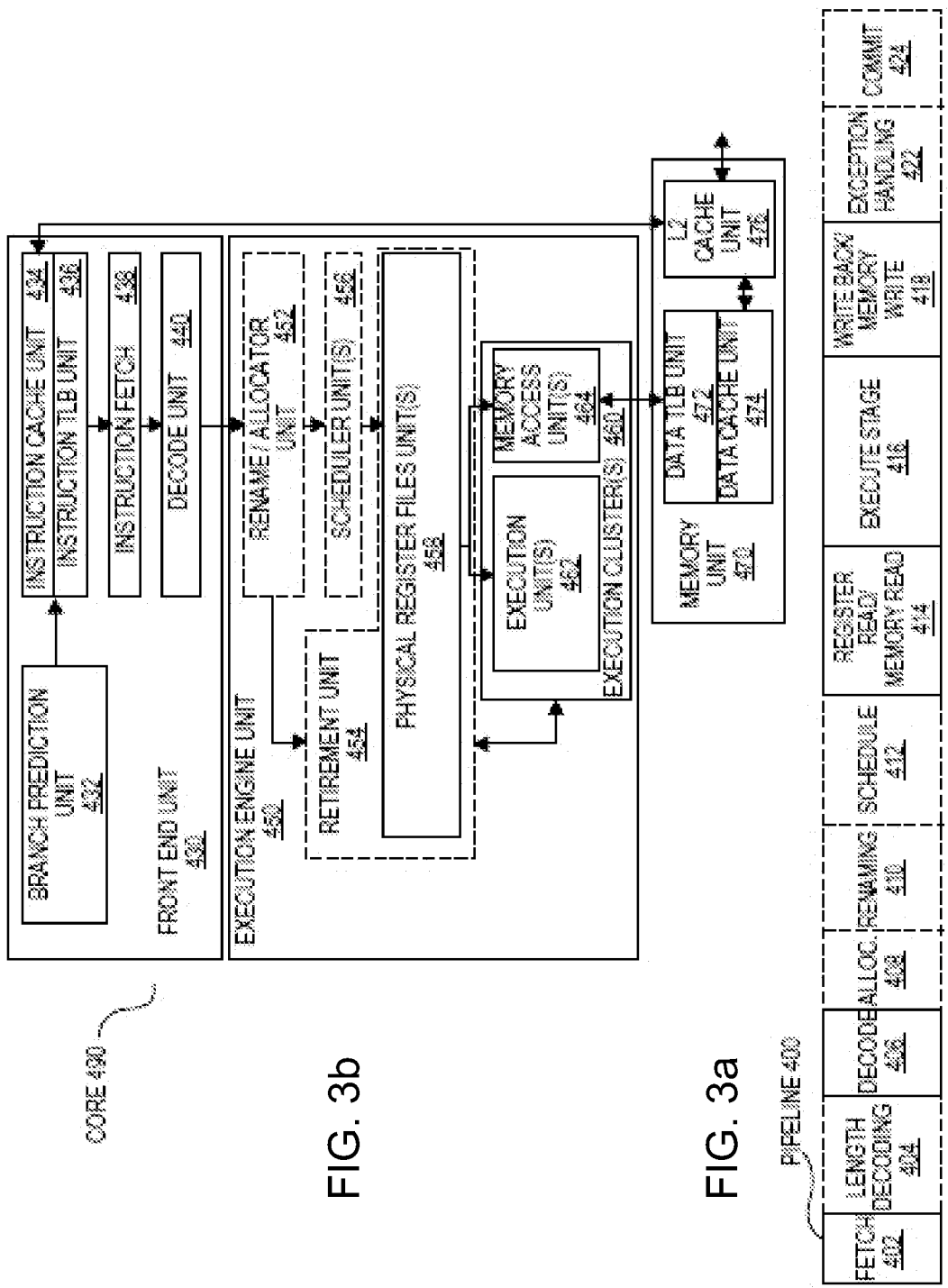
FIGS. 3a-3b schematically illustrates elements of a processor micro-architecture, in accordance with one or more aspects of the present disclosure.

FIGS. 3*a*-3*b* schematically illustrates elements of a processor micro-architecture, in accordance with one or more aspects of the present disclosure. In FIG. 3*a*, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 3*b*, arrows denote a coupling between two or more units and the direction of the arrow indicates a direction of data flow between those units. FIG. 3*b* shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
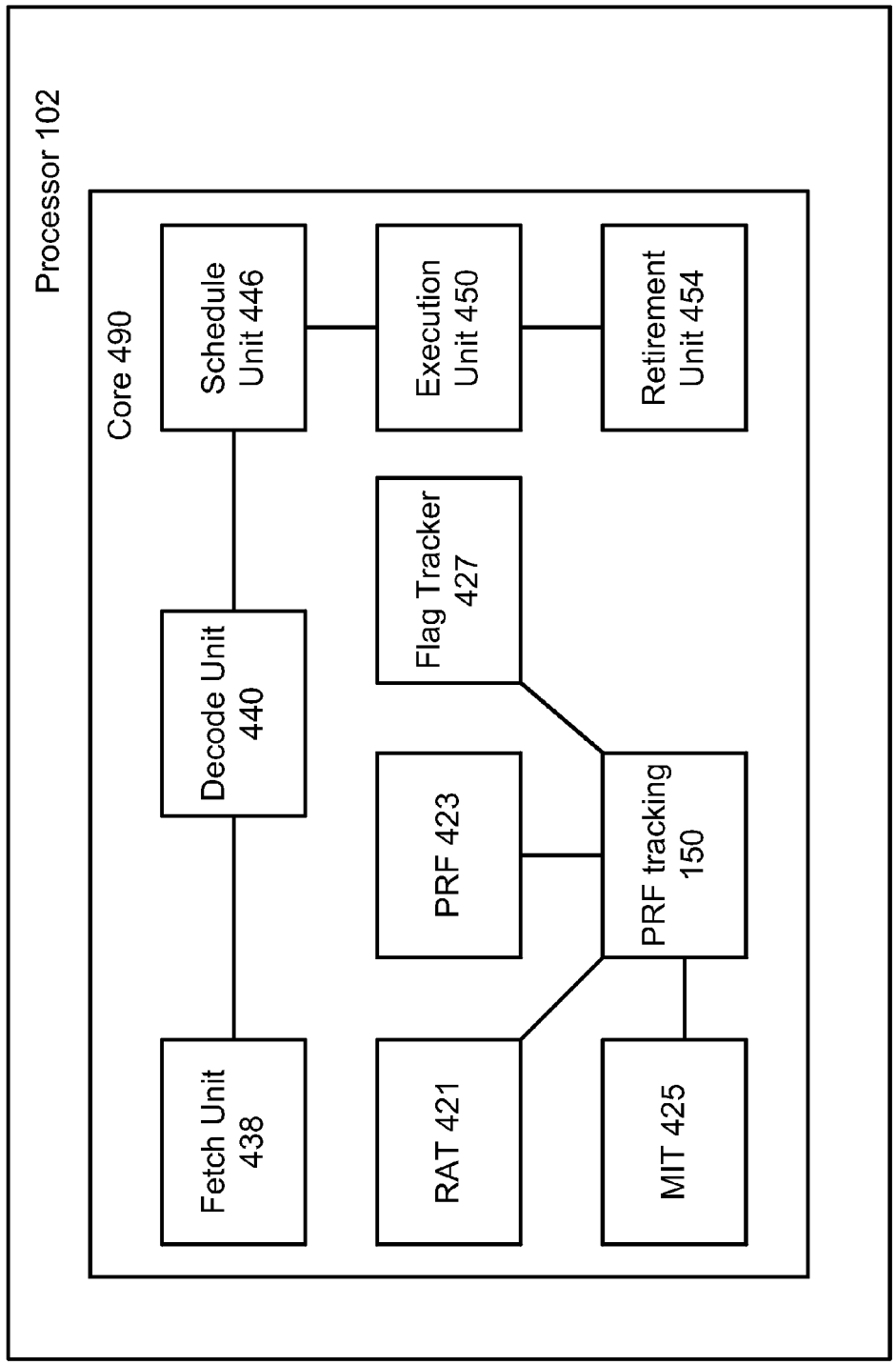
FIG. 4 schematically illustrates several aspects an example processor and other components of the example computer system 100 of FIG. 1, in accordance with one or more aspects of the present disclosure.

FIG. 4 illustrates a block diagram of an example processor 102 and other components of the computer system 100, in accordance with one or more aspects of the present disclosure. Referring to FIG. 4, the processor core 490 may include a fetch unit 202 to fetch instructions for execution by the core 490. The instructions may be fetched from one or more storage devices, such as the memory 115. The processor core 490 may further include a decode unit 440 to decode a fetched instruction into a one or more micro-operations (tops). The processor core 490 may further include a schedule unit 446 to store a decoded instruction received from the decode unit 440 until the instruction is ready to be issued, e.g., until the operand values for the decoded instruction become available. The schedule unit 446 may schedule and/or issue decoded instructions to an execution unit 450.

The execution unit 450 may include one or more arithmetic and logic units (ALUs), one or more integer execution units, one or more floating-point execution unit, and/or other execution units. In certain implementations, the execution unit 450 may execute instructions out-of-order (OOO). The processor core 490 may further include a retirement unit 454 to retire executed instructions after they are committed.

The processor core 490 may further include a Register Alias Table (RAT) 421, a Physical Register File (PRF) 423, a Move Elimination Table (MIT) 425, a Flag Tracker 427, and a PRF tracking logic 150. Even though in FIG. 4 the logic 150 is shown to be inside a core 490, the logic 150 may be provided elsewhere in the computer system 100. Furthermore, the logic 150 and/or some of its components may be shared among a plurality of processor cores.

As noted herein above, a move instruction may be eliminated by copying the source register pointer to the destination register pointer in the RAT. FIG. 5 schematically illustrates executing MOV DX, AX instruction by register aliasing: the contents of RAT entry for AX, which is a pointer to an entry X in PRF, gets copied to the RAT entry for DX. As illustrated by FIG. 5, in certain implementations, the PRF may be provided by an array of physical register values, and the RAT may be provided by an array of pointers to PRF entries.

An integer instruction may modify not only a destination register value, but also one or more of processor status flags, including, e.g., Carry flag (C), Sign flag (S), Parity flag (P), Adjust flag (A), Zero flag (Z), and/or Overflow flag (O). To store flag values, each PRF entry can include, along with a field for the data register value, one or more fields for the flag values. In certain implementations, processor status flags can be stored in two PRF fields: a C bit field for storing the value the Carry flag, and a SPAZO 5-bit field for storing the values of S, P, A, Z, and O flags. If one or more bits in the field are to be updated with a new value, the remaining bits are to be updated as well with the previous version of those bits. In other words, for a given point in the program execution, a single PRF entry contains the up-to-date values of those flags in the field for that program point. For C and SPAZO groupings, a single PRF entry or a combination of two physical registers are required to represent the correct flag state at a given point in the program. Thus, a result of an integer micro-operation may include a destination data register value and flag values that may be written into one PRF entry comprising the three above noted fields. Other implementations may group all of the flag bits into one field requiring just one PRF entry to represent the flag state at a program point; other implementations may manage each flag bit as a separate field, requiring up to six PRF entries to represent the flag state at a program point, for a processor with CSPAZO flag state as previously described.

The RAT may include one or more pointers mapping flag values to the PRF entries. In certain implementations, the RAT may include an entry mapping the C flag value to a PRF entry and an entry mapping SPAZO flag values to a PRF entry. Hence, processor status flags may have their own logical entries in the RAT (also referred to as "flag logical registers"), but share PRF entries with data registers: as a result of an operation architecturally updating both data and status flags, several RAT entries may be updated to map to the same PRF entry.

A PRF entry referenced by multiple RAT entries may become available to use by subsequent instructions after the multiple RAT pointers, including data and flag pointers, have been overwritten by one or more instructions. Hence, a tracking mechanism is needed for tracking multiple RAT pointers referencing a PRF entry.

In certain implementations, a data structure referred to as a Flag Tracker may be employed for tracking shared usage of PRF entries by data and flag logical registers. The Flag Tracker may comprise one or more sets of fields representing one or more status flags. As schematically shown by FIG. 6a, in one example, the Flag Tracker may be provided by a two-dimensional array having two columns representing C and SPAZO status flags, respectively. LDstV bit may be set to indicate that the logical data register identified by LDst field shares a PRF entry with the corresponding (e.g., C or SPAZO) flag register. At the allocation time, when a logical register has been overwritten and the flags have also been overwritten (assuming no move elimination), the associated physical register can be reclaimed after the overwriting instruction retires. When a logical register that currently shares the physical register with the flags has been overwritten, but all or some of the flags have not been overwritten, the LDstV fields corresponding to those flag fields are cleared. Only after those particular flag groups have also been overwritten, can the physical register be reclaimed.

In certain implementations, a data structure, referred as a Multiple Instantiation Table (MIT), may be employed for tracking references to PRF entries. In certain implementations, the MIT may store multiple sets of bits, where a set of bits may represent a move elimination operation, and a bit within a set may represent a logical data register. The MIT may be implemented as a two-dimensional array (e.g., a bit matrix) having a plurality of rows representing logical registers, and a plurality of columns representing move elimination sets, in which a set bit indicates that the corresponding data register participates in the move elimination set.

When only one register mapping remains in a move elimination set, so that the corresponding PRF entry has only one reference remaining, the move elimination set provided by an MIT column may still not be available for allocation to another move instruction. Such a set may be referred to as an "orphan" set, since it has only one register mapping. Without some action to clear an orphan set, it may remain unavailable until the last logical register is overwritten, thus reducing the number of possible move eliminations.

FIGS. 7a-7c schematically illustrate several examples of using a Multiple Instantiation Table (MIT) for Physical Register File (PRF) entry tracking, in accordance with one or more aspects of the present disclosure. When a move operation is eliminated, the bits corresponding to the source and destination logical registers may be set, indicating that these logical registers are part of the move elimination set, as schematically illustrated by FIG. 7a. If the source of the move instruction is a logical register that already participates in a move elimination set, the destination logical register is added to the set, as schematically illustrated by FIG. 7b. When a register participating in a move elimination set is overwritten by another instruction, the corresponding MIT bit (which has previously been set) may be cleared, thus dissociating the logical register from the move elimination set, as schematically illustrated by FIG. 7c. The corresponding physical register which is not a part of any move elimination set or is the only member of a move elimination set may be reused by a new instruction once all references to the physical register have been overwritten by one or more instructions and subsequently retired.

The example illustrated by FIGS. 7a-7c does not take into account possible sharing of PRF entries by data and flag logical registers. In certain implementations, the Flag Tracker may further include a SharedFlag bit which indicates whether C and SPAZO flags share the same PRF entry. In situations when one of C or SPAZO flags is overwritten by an instruction, the other flag logical register may continue to point to the same PRF entry until the second flag also becomes overwritten by another instruction.

As schematically illustrated by FIG. 6b, in one example, the Flag Tracker may be enhanced to include Move Elimination Valid (MEV) and Move Elimination Column (MECol) fields. The MEV bit may be set to indicate that the MECol field stores a valid identifier of a MIT column representing a move elimination set in which the flag register shares a PRF entry with logical registers. In certain implementations, LDst and MECol fields can be represented by a shared field, since only one of the two may be valid at any given time.

FIGS. 8a-8c illustrate an example of employing the Flag Tracker for tracking shared usage of PRF entries by data and flag logical registers. FIG. 8a shows the initial state of the C Flag Tracker: after EAX register and C flag have been updated by an executed instruction, LDstV bit is set to indicate that C flag shares a PRF entry with the logical register identified by LDst field. FIG. 8b illustrates the result of an operation copying EAX to EBX: the EAX pointer in RAT is copied to EBX (not shown); a move elimination set is created (not shown) including EAX, EBX, and C flag associated with it; in the Flag Tracker, LDstV bit is cleared to indicate that the value of LDst is no longer relevant, MEV bit is set, and the move elimination set identifier (the number of the corresponding MIT column) is written into MECol. FIG. 8c illustrates the result of EAX register being overwritten with a new value without updating C flag: LDst field is updated to indicate the C flag shares a PRF entry with only one register (EBX), LDstV bit is set to indicate that C flag shares a PRF entry with the logical register identified by LDst field (EBX), and MEV bit is cleared to indicate that MECol does not reference a valid move elimination set.

In certain implementations, the MIT may be enhanced to associate one or more bits representing one or more logical flag registers with each move elimination set. The association may be performed by adding one or more bits representing one or more logical flag registers to each MIT column. Hence, an MIT column may include a move elimination set (comprising a plurality of bits representing logical data registers) and one or more bits representing one or more logical flag registers. In certain implementations, a single bit may represent two or more logical flag registers. In one example, a first bit representing C flag and/or a second bit representing SPAZO flags may be added to each MIT column.

Adding logical flag registers to MIT columns eliminates the necessity to set LDst and LDstV fields in the Flag Tracker after a move elimination set becomes an orphan (a situation illustrated by the example of FIG. 8c), thus simplifying the system design and improving the execution efficiency, as described in more details herein below with references to the examples of FIGS. 9-10. The purpose of setting a flag bit in an MIT column is to prevent the orphan recovery logic from reclaiming the corresponding move elimination set when only one logical data register remains in the set.

For further improving execution efficiency, the logic 150 may conservatively assume that any move elimination operation may include a logical register that shares a PRF entry with C and SPAZO status flags. Hence, the tracking logic may speculatively set the flag bits (e.g., C and SPAZO flag bits) in the MIT responsive to creating or adding a register to a move elimination set. When a flag is overwritten, the corresponding MIT bit may be cleared from all columns in the MIT to indicate that the flag is not associated with the move elimination sets. As noted herein above, in certain implementations, only logical and arithmetic operations can write flag bits, hence the result of those operations is always written to a new physical register which can only be shared after a subsequent move operation.

Since in some implementations MIT flag bits may be set speculatively, a MIT flag bit does not necessarily indicate that the corresponding flag shares a PRF entry with other members of the move elimination set. To facilitate flag tracking, the logic 150 may generate several signals reflecting MIT updates, including a signal, referred to as MITOvrWrCol, identifying a move elimination set (e.g., by a number of the corresponding MIT column) from which a logical register will be removed due to an allocated micro-operation, and a signal, referred to as LDstIsME, indicating whether the destination register for that micro-operation is shared with another logical register. When MEV bit for a flag is set (indicating that the flag register is associated with a move elimination set), MITOvrWrCol signal matches MECol (indicating that the operation being executed is freeing a logical register from the move elimination set that shares a PRF entry with the flag logical register), and LDstIsME signal is false (indicating the logical register overwritten by the LDst of the operation was the last remaining register in the move elimination set), the flag register no longer shares a PRF entry with a data register. Thus, MEV bit may be cleared, and the next flag write operation may reclaim the PRF entry.

The flag tracking logic is further described with references to the examples schematically illustrated by FIGS. 9a-9d and 10a-10d. For clarity of the description, only one MIT column, one status flag, and two registers are shown, but it should be understood that an implementation may contain a plurality of MIT columns, a plurality of status flag fields, and a plurality of logical registers.

In one example, FIG. 9a shows the initial state of MIT column 0 and C Flag Tracker: after EAX register and C flag have been updated by an executed instruction, LDstV bit is set to indicate that C flag shares a PRF entry with the logical register identified by LDst field. FIG. 9b illustrates the result of an operation copying EAX to EBX: the EAX pointer in RAT is copied to EBX (not shown); a move elimination set including EAX, EBX, and C flag is created; in the Flag Tracker, LDstV bit is cleared to indicate that the value of Ldst is no longer relevant, MEV bit is set, and the move elimination set identifier (the number of the corresponding MIT column) is written into MECol. FIG. 9c illustrates the result of EAX register being overwritten with a new value: the MIT entry reflects removal of EAX from the move elimination set by clearing the bit representing EAX; Flag Tracker remains the same; orphan reclamation is disabled because the flag bit is still set, indicating that the flags might share a PRF entry with EBX. FIG. 9d illustrates the result of EBX register, which is the last remaining data register in the move elimination set, being overwritten with a new value, but the status flags not being overwritten: the MIT entry reflects removal of EBX from the move elimination set by clearing the corresponding bit; in the Flag Tracker, MEV bit is cleared, and hence, the next writer to C flag will reclaim the PRF entry. As such, MIT Column 0 is free to be used for another move elimination; the C flag is not being shared with any other logical registers and thus no sharing needs to be tracked in either of the structures. If C flag was updated along with EBX update, the PRF entry would be marked for reclamation in this cycle.

In another example, FIG. 10a shows the initial state of several data structures: after EAX register and C flag have been updated by an executed instruction, LDstV bit is set to indicate that C flag shares a PRF entry with the logical register identified by LDst field. FIG. 10b illustrates the result of a move elimination operation MOV EBX, EAX: the EAX pointer in the RAT is copied to EBX (not shown); a move elimination set is created, including EAX, EBX, and C flag associated with it; in the Flag Tracker, LDstV bit is cleared, MEV bit is set, and the move eliminated set identifier (the number of the corresponding MIT column) is written into MECol. FIG. 10c illustrates the result of both EAX register and C flag being overwritten with new values: the MIT entry reflects removal of EAX and C flag from the move elimination set by clearing the corresponding bits; the Flag Tracker is updated to reflect the association of C flag and EAX register: LDstV bit is set, and MEV bit is cleared. Hence, EBX is the last register remaining in the move elimination set, and in the next cycle the orphan recovery mechanism will reclaim the corresponding move elimination column, as schematically illustrated by FIG. 10d. Assuming EBX does not become a member of a new move eliminated set, the PRF entry used by EBX will be marked for reclamation the next time it is overwritten.

Figure 11:
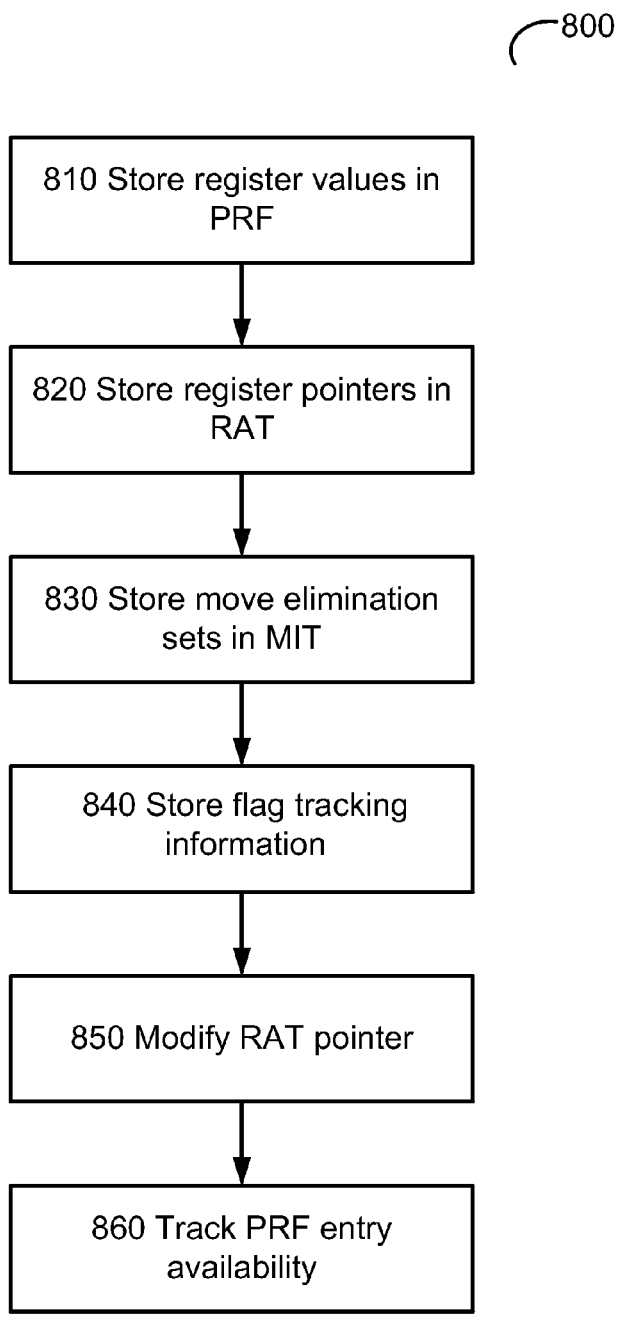
FIG. 11 depicts a flow diagram of an example method for flag tracking in move elimination operations, in accordance with one or more aspects of the present disclosure.

FIG. 11 depicts a flow diagram of an example method for flag tracking in move elimination operations, in accordance with one or more aspects of the present disclosure. The method 800 may be performed by a computer system that may comprise hardware (e.g., circuitry, dedicated logic, and/or programmable logic), software (e.g., instructions executable on a computer system to perform hardware simulation), or a combination thereof. The method 800 and/or each of its functions, routines, subroutines, or operations may be performed by one or more physical processors of the computer system executing the method. Two or more functions, routines, subroutines, or operations of method 800 may be performed in parallel or in an order which may differ from the order described above. In one example, as illustrated by FIG. 11, the method 800 may be performed by the computer system 100 of FIG. 1.

Referring to FIG. 11, at block 810, a computing system may store a plurality of physical register values in a first data structure, referred to as PRF.

At block 820, the computing system may store, in a second data structure referred to as RAT, a plurality of pointers referencing elements of the first data structure.

At block 830, the computing system may store, in a third data structure, referred to as MIT, a plurality of bits representing a plurality of logical registers.

At block 840, the computing system may store, in a fourth data structure, referred to as Flag Tracker, an identifier of a data register sharing an element of the first data structure with a flag register.

At block 850, the computing system may perform a move elimination operation by causing an element of the second data structure to reference an element of the first data structure.

At block 860, the computing system may track, using at least one of the third data structure and the fourth data structure, availability of elements of the first data structure. Upon completing the operations referenced by block 850, the method may terminate.

Figure 12:
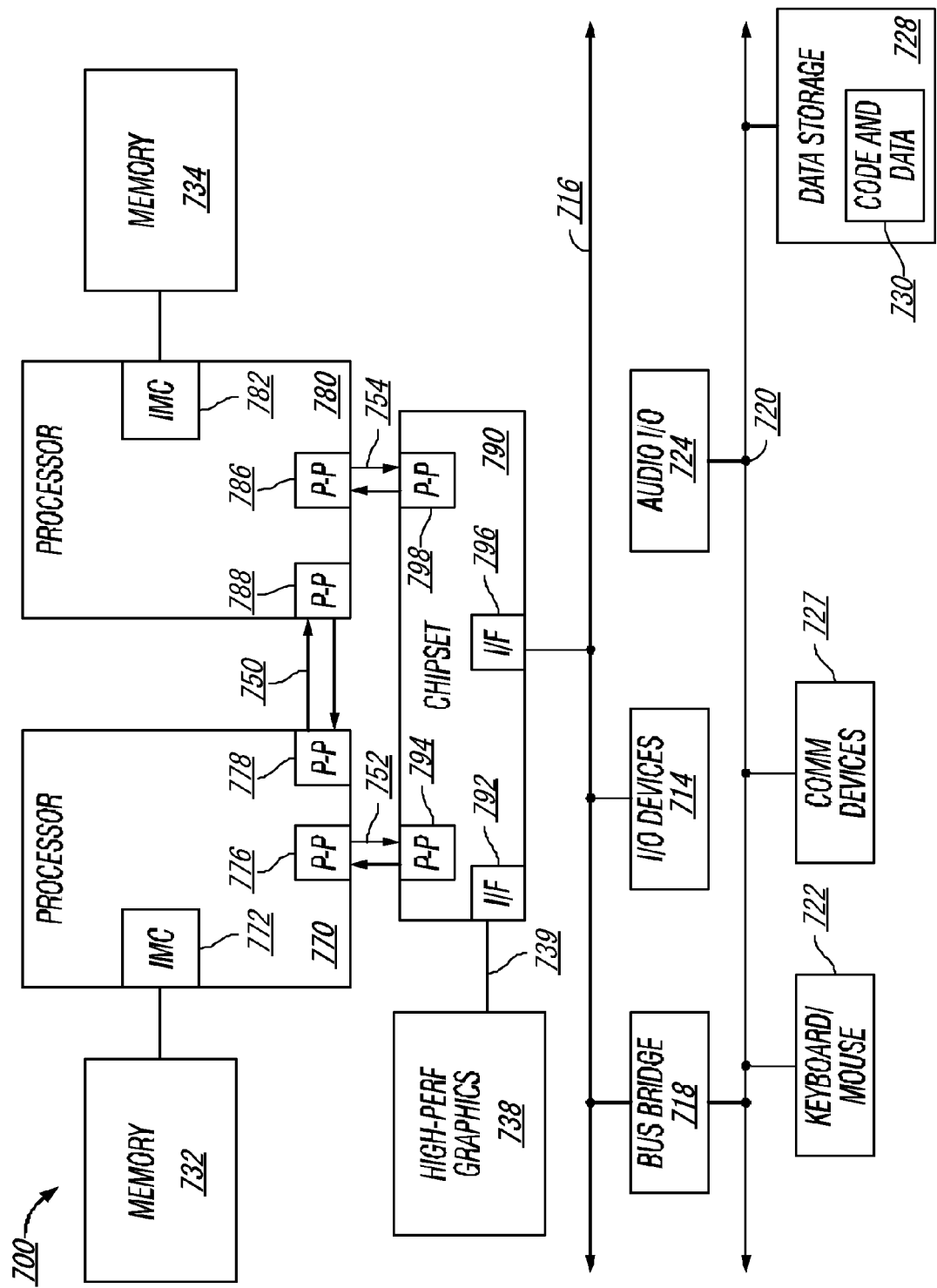
FIG. 12 depicts a block diagram of an example computer system, in accordance with one or more aspects of the present disclosure.

FIG. 12 depicts a block diagram of an example computer system, in accordance with one or more aspects of the present disclosure. As shown in FIG. 12, multiprocessor system 700 is a point-to-point interconnect system, and includes a first processor 770 and a second processor 780 coupled via a point-to-point interconnect 750. Each of processors 770 and 780 may be some version of the processor 102 capable of executing transactional memory access operations and/or non-transactional memory access operations, as described in more details herein above.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 12, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 12, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 12, a system may implement a multi-drop bus or other such architecture.

The following examples illustrate various implementations in accordance with one or more aspect of the present disclosure.

Example 1 is a processing system, comprising: a first data structure including a plurality of physical register values; a second data structure including a plurality of pointers referencing elements of the first data structure; a third data structure including a plurality of move elimination sets, each move elimination set comprising two or more bits representing two or more logical data registers, the third data structure further comprising at least one bit associated with each move elimination set, the at least one bit representing one or more logical flag registers; a fourth data structure including an identifier of a data register sharing an element of the first data structure with a flag register; and a move elimination logic configured to perform a move elimination operation by causing an element of the second data structure to reference an element of the first data structure, the move elimination logic further configured to track, using at least one of the third data structure and the fourth data structure, availability of elements of the first data structure.

In Example 2, the move elimination logic of the processing system of Example 1 may be configured to change a value of a flag bit in the third data structure responsive to at least one of: creating a new move elimination set, adding a register to a move elimination set, or writing new data to a flag register in the first data structure.

In Example 3, the move elimination logic of the processing system of Example 1 may be configured to detect and reclaim a move elimination set having only one non-zero bit.

In Example 4, the move elimination logic of the processing system of Example 1 may be configured to cancel reclaiming a move elimination set having at least one non-zero bit, responsive to determining that at least one bit associated with the move elimination set and representing a logical flag register has a non-zero value.

In Example 5, the fourth data structure of the processing system of Example 1 may comprise: a bit indicating validity of the move elimination set, a bit indicating that a logical flag register shares an entry of the first data structure with the data register, a first identifier identifying a data register sharing an element of the first data structure with a flag register, and a second identifier identifying a move elimination set.

In Example 6, the first identifier and the second identifier of the processing system of Example 5 may be represented by a common data field.

In Example 7, the move elimination logic of the processing system of Example 1 may be further configured to generate a first signal identifying a move elimination set having one or more logical registers overwritten by an allocated micro-operation, and a second signal indicating a shared use of a destination register for the micro-operation.

In Example 8, the move elimination logic of the processing system of Example 7 may be further configured to update the fourth data structure to indicate that a flag register no longer shares an element of the first data structure with a data register, responsive to determining that a logical flag register corresponding to the flag register is associated with a first move elimination set, the first signal matches the identifier of the first move elimination set, and the second signal is false.

Example 9 is a method of performing a data manipulation operation, comprising: storing, by a computing system, a plurality of physical register values in a first data structure; storing, in a second data structure, a plurality of pointers referencing elements of the first data structure; storing, in a third data structure, a plurality of move elimination sets and at least one bit associated with each move elimination set, the at least one bit representing one or more logical flag registers, each move elimination set comprising two or more bits representing two or more logical data registers; storing, in a fourth data structure, an identifier of a data register sharing an element of the first data structure with a flag register; performing a move elimination operation by causing an element of the second data structure to reference an element of the first data structure; and tracking, using at least one of the third data structure and the fourth data structure, availability of elements of the first data structure.

In Example 10, the method of Example 9 may further comprise changing a value of a flag bit in the third data structure responsive to at least one of: creating a new move elimination set, adding a register to a move elimination set, or writing new data to a flag register in the first data structure.

In Example 11, the method of Example 9 may further comprise detecting and reclaiming a move elimination set having only one non-zero bit.

In Example 12, the method of Example 11 may further comprise canceling reclamation of a move elimination set having at least one non-zero bit, responsive to determining that at least one bit associated with the move elimination set and representing a logical flag register has a non-zero value.

In Example 13, the fourth data structure of the method of Example 9 may comprise: a bit indicating validity of the move elimination set, a bit indicating that a logical flag register shares an entry of the first data structure with the data register, a first identifier identifying a data register sharing an element of the first data structure with a flag register, and a second identifier identifying a move elimination set.

In Example 14, the first identifier and the second identifier of the method of Example 13 may be represented by a common data field.

In Example 15, the method of Example 9 may further comprise generating a first signal identifying a move elimination set having one or more logical registers overwritten by an allocated micro-operation, and a second signal indicating a shared use of a destination register for the micro-operation.

In Example 16, the method of Example 15 may further comprise updating the fourth data structure to indicate that a flag register no longer shares an element of the first data structure with a data register, responsive to determining that a logical flag register corresponding to the flag register is associated with a first move elimination set, the first signal matches the identifier of the first move elimination set, and the second signal is false.

Example 17 is an apparatus comprising a memory and a processing system coupled to the memory, wherein the processing system is configured to perform the method of any of the Examples 9-16.

Example 18 is a computer-readable non-transitory storage medium comprising executable instructions that, when executed by a computing system, cause the computing system to perform operations, comprising: storing, by a computing system, a plurality of physical register values in a first data structure; storing, in a second data structure, a plurality of pointers referencing elements of the first data structure; storing, in a third data structure, a plurality of move elimination sets and at least one bit associated with each move elimination set, the at least one bit representing one or more logical flag registers, each move elimination set comprising two or more bits representing two or more logical data registers; storing, in a fourth data structure, an identifier of a data register sharing an element of the first data structure with a flag register; performing a move elimination operation by causing an element of the second data structure to reference an element of the first data structure; and tracking, using at least one of the third data structure and the fourth data structure, availability of elements of the first data structure.

In Example 19, the computer-readable non-transitory storage medium of Example 18 may further comprise executable instructions causing the computing system to change a value of a flag bit in the third data structure responsive to at least one of: creating a new move elimination set, adding a register to a move elimination set, or writing new data to a flag register in the first data structure.

In Example 20, the computer-readable non-transitory storage medium of Example 18 may further comprise executable instructions causing the computing system to detect and reclaim a move elimination set having only one non-zero bit.

In Example 21, the computer-readable non-transitory storage medium of Example 20 may further comprise executable instructions causing the computing system to cancel reclamation of a move elimination set having at least one non-zero bit, responsive to determining that at least one bit associated with the move elimination set and representing a logical flag register has a non-zero value.

In Example 22, the fourth data structure of the computer-readable non-transitory storage medium of Example 18 may comprise: a bit indicating validity of the move elimination set, a bit indicating that a logical flag register shares an entry of the first data structure with the data register, a first identifier identifying a data register sharing an element of the first data structure with a flag register, and a second identifier identifying a move elimination set.

In Example 23, the first identifier and the second identifier of Example 22 may be represented by a common data field.

In Example 24, the computer-readable non-transitory storage medium of Example 18 may further comprise executable instructions causing the computing system to generate a first signal identifying a move elimination set having one or more logical registers overwritten by an allocated micro-operation, and a second signal indicating a shared use of a destination register for the micro-operation.

In Example 25, the computer-readable non-transitory storage medium of Example 18 may further comprise executable instructions causing the computing system to update the fourth data structure to indicate that a flag register no longer shares an element of the first data structure with a data register, responsive to determining that a logical flag register corresponding to the flag register is associated with a first move elimination set, the first signal matches the identifier of the first move elimination set, and the second signal is false.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
   a first data structure including a plurality of physical register values;

a second data structure including a plurality of pointers referencing elements of the first data structure;

a third data structure including a plurality of move elimination sets, each move elimination set comprising two or more bits representing two or more logical data registers, the third data structure further comprising at least one bit associated with each move elimination set, the at least one bit representing one or more logical flag registers;

a fourth data structure including an identifier of a data register sharing an element of the first data structure with a flag register; and a move elimination logic to perform a move elimination operation by causing an element of the second data structure to reference an element of the first data structure, the move elimination logic further to track, using at least one of the third data structure and the fourth data structure, availability of elements of the first data structure.

2. The processing system of claim 1, wherein the move elimination logic is further to change a value of a flag bit in the third data structure responsive to at least one of: creating a new move elimination set, adding a register to a move elimination set, or writing new data to a flag register in the first data structure.

3. The processing system of claim 1, wherein the move elimination logic is further to detect and reclaim a move elimination set having only one non-zero bit.

4. The processing system of claim 3, wherein the move elimination logic is further to cancel reclaiming a move elimination set having at least one non-zero bit, responsive to determining that at least one bit associated with the move elimination set and representing a logical flag register has a non-zero value.

5. The processing system of claim 1, wherein the fourth data structure comprises: a bit indicating validity of the move elimination set, a bit indicating that a logical flag register shares an entry of the first data structure with the data register, a first identifier identifying a data register sharing an element of the first data structure with a flag register, and a second identifier identifying a move elimination set.

6. The processing system of claim 5, wherein the first identifier and the second identifier are represented by a common data field.

7. The processing system of claim 1, wherein the move elimination logic is further to generate a first signal identifying a move elimination set having one or more logical registers overwritten by an allocated micro-operation, and a second signal indicating a shared use of a destination register for the micro-operation.

8. The processing system of claim 7, wherein the move elimination logic is further to update the fourth data structure to indicate that a flag register no longer shares an element of the first data structure with a data register, responsive to determining that a logical flag register corresponding to the flag register is associated with a first move elimination set, the first signal matches the identifier of the first move elimination set, and the second signal is false.

9. A method, comprising:

storing, by a computing system, a plurality of physical register values in a first data structure;

storing, in a second data structure, a plurality of pointers referencing elements of the first data structure;

storing, in a third data structure, a plurality of move elimination sets and at least one bit associated with each move elimination set, the at least one bit representing one or more logical flag registers, each move elimination set comprising two or more bits representing two or more logical data registers;

storing, in a fourth data structure, an identifier of a data register sharing an element of the first data structure with a flag register;

performing a move elimination operation by causing an element of the second data structure to reference an element of the first data structure; and tracking, using at least one of the third data structure and the fourth data structure, availability of elements of the first data structure.

10. The method of claim 9, further comprising changing a value of a flag bit in the third data structure responsive to at least one of: creating a new move elimination set, adding a register to a move elimination set, or writing new data to a flag register in the first data structure.

11. The method of claim 9, further comprising detecting and reclaiming a move elimination set having only one non-zero bit.

12. The method of claim 11, further comprising canceling reclamation of a move elimination set having at least one non-zero bit, responsive to determining that at least one bit associated with the move elimination set and representing a logical flag register has a non-zero value.

13. The method of claim 9, wherein the fourth data structure comprises: a bit indicating validity of the move elimination set, a bit indicating that a logical flag register shares an entry of the first data structure with the data register, a first identifier identifying a data register sharing an element of the first data structure with a flag register, and a second identifier identifying a move elimination set.

14. The method of claim 13, wherein the first identifier and the second identifier are represented by a common data field.

15. The method of claim 9, further comprising generating a first signal identifying a move elimination set having one or more logical registers overwritten by an allocated micro-operation, and a second signal indicating a shared use of a destination register for the micro-operation.

16. The method of claim 15, further comprising updating the fourth data structure to indicate that a flag register no longer shares an element of the first data structure with a data register, responsive to determining that a logical flag register corresponding to the flag register is associated with a first move elimination set, the first signal matches the identifier of the first move elimination set, and the second signal is false.

17. A computer-readable non-transitory storage medium comprising executable instructions that, when executed by a computing system, cause the computing system to perform operations, comprising:

storing, by a computing system, a plurality of physical register values in a first data structure;

storing, in a second data structure, a plurality of pointers referencing elements of the first data structure;

storing, in a third data structure, a plurality of move elimination sets and at least one bit associated with each move elimination set, the at least one bit representing one or more logical flag registers, each move elimination set comprising two or more bits representing two or more logical data registers;

storing, in a fourth data structure, an identifier of a data register sharing an element of the first data structure with a flag register;

performing a move elimination operation by causing an element of the second data structure to reference an element of the first data structure; and tracking, using at least one of the third data structure and the fourth data structure, availability of elements of the first data structure.

18. The computer-readable non-transitory storage medium of claim 17, further comprising executable instructions causing the computing system to change a value of a flag bit in the third data structure responsive to at least one of: creating a new move elimination set, adding a register to a move elimination set, or writing new data to a flag register in the first data structure.

19. The computer-readable non-transitory storage medium of claim 17, further comprising executable instructions causing the computing system to detect and reclaim a move elimination set having only one non-zero bit.

20. The computer-readable non-transitory storage medium of claim 19, further comprising executable instructions causing the computing system to cancel reclamation of a move elimination set having at least one non-zero bit, responsive to determining that at least one bit associated with the move elimination set and representing a logical flag register has a non-zero value.

\* \* \* \* \*